United States Patent
Ferry et al.

(10) Patent No.: US 7,362,696 B2
(45) Date of Patent: Apr. 22, 2008

(54) METHOD AND APPARATUS FOR AUTOMATIC TRANSFER SWITCH

(75) Inventors: Thomas Ferry, New Lenox, IL (US); Edward Kassel, Barrington, IL (US)

(73) Assignee: General Electric Company, Schenectady, NY (US)

( * ) Notice: Subject to any disclaimer, the term of this patent is extended or adjusted under 35 U.S.C. 154(b) by 830 days.

(21) Appl. No.: 10/065,461

(22) Filed: Oct. 21, 2002

(65) Prior Publication Data

US 2004/0076148 A1    Apr. 22, 2004

(51) Int. Cl.
*G06F 11/00*    (2006.01)

(52) U.S. Cl. .................. 370/217; 370/503; 307/64

(58) Field of Classification Search .............. None
See application file for complete search history.

(56) References Cited

U.S. PATENT DOCUMENTS

| | | | |
|---|---|---|---|
| 4,189,649 A * | 2/1980 | Przywozny et al. | 307/64 |
| 4,672,227 A * | 6/1987 | Lagree et al. | 307/64 |
| 5,023,469 A | 6/1991 | Bassett et al. | 307/64 |
| 5,739,594 A | 4/1998 | Sheppard et al. | 307/64 |
| 5,903,065 A * | 5/1999 | Dragos | 307/64 |
| 6,172,432 B1 * | 1/2001 | Schnackenberg et al. | 307/23 |

OTHER PUBLICATIONS

University of Washington Engineering Services Facility Design Information, Automatic Transfer Switch, pp. 1-11, Aug. 2002.*
Zenith, Operation And Maintenance Manual Transfer Switch Control Panel MX200 Microprocessor Controller, p. 1-34, 1998.*

* cited by examiner

*Primary Examiner*—Frank Duong
(74) *Attorney, Agent, or Firm*—Cantor Colburn LLP (57) ABSTRACT

An automatic transfer switch includes; a housing, at least one switch for switching electrical connection from a first external power source to a second external power source, and a first and at least a second timer disposed within the housing, wherein the first and the at least a second timer have a first and at least a second time delay, respectively. The at least one switch being responsive to the first and the at least a second timer, and the at least a second time delay being nested within the first time delay.

6 Claims, 5 Drawing Sheets

FIG. 4
Transfer-to-Primary, Timers 250

FIG. 5

METHOD AND APPARATUS FOR AUTOMATIC TRANSFER SWITCH

TECHNICAL FIELD

This invention relates generally to an automatic transfer switch (ATS), and more particularly to a method and apparatus for switching an electrical connection from one power source to another in accordance with specified parameters.

BACKGROUND

An ATS provides a substantially continuous source of power for specified loads, such as for example motors and elevators, by automatically transferring the line-to-load connection from a normal power source to a secondary power source when the normal power source falls below pre-established thresholds. The substantially continuous source of power may vary from several seconds of power outage to several seconds of power overlap during transfer, depending on the type of ATS employed. The ability for two power sources to be connected to a load at the same time is generally a function of the controllers and drive systems employed by the ATS, which result in the parallel connection being established for only a fraction of a second, and typically less than 100 milliseconds.

Typical ATS devices comprise a plurality of switching contacts (switches), a drive mechanism, electrical terminal connectors, a controller, a display, and logic devices (such as, for example, voltage, current, and frequency sensors and timers), all typically contained within an enclosure. Control of the switching contacts is provided by a microprocessor, which controls the operation of the ATS's components, including the switches, timers, drive systems, and displays. The display provides a means for displaying the status of the ATS's position, the timers, and the available power sources. Control signals from the controller to the timers and drive system, or software logic within the microprocessor itself, are typically provided in a serial arrangement, and typically result in the actuation of one or more switching contacts, thereby transferring the power feed from one power source, such as a primary source (for example, a utility) to another, such as a backup source (for example, a generator).

An extended ATS control system would typically include at least one automatic transfer switch, as previously described, and a remote computer adapted to be in communication with the ATS's controller, thereby providing remote control and programming of the ATS. Programming of the ATS could be accomplished at either the remote computer or at a touchpad interface on the microcontroller itself, thereby providing for automatic transfer switching when predetermined thresholds are met.

Under primary power conditions, the ATS is typically connected to the primary source. However, when a source parameter, such as voltage, drops below a pre-established threshold, such as 80% of nominal voltage, a transfer sequence is initiated. One example of a transfer sequence includes the starting of a backup engine generator set when the primary source below-threshold signal is received at the controller. When the emergency source reaches 90% of rated voltage and 95% of rated frequency, for example, the drive mechanism is energized, causing the main contacts to disconnect the load from the primary source and connect it to the backup source. After the drive mechanism has completed its stroke and is seated, the drive control de-energizes to disconnect the drive solenoid. The transfer switch is now mechanically locked in the backup position. A reverse action occurs when the primary source voltage is restored to a predetermined level, for example 90% of nominal.

SUMMARY

In one embodiment, an automatic transfer switch includes a housing, a switch for switching electrical connection from a first external power source to a second external power source, and a first and second timer disposed within the housing, wherein the first and second timers have a first and second time delays, respectively. The switch being responsive to the first and second timers, and the second time delay being nested within the first time delay.

In another embodiment, a method of switching an automatic transfer switch between first and second power sources includes receiving a first control signal at a first timer in response to a below-threshold signal at a primary source, initiating a first time delay at a first timer in response to the first control signal, receiving a second control signal at a second timer from the controller, initiating a second time delay at a second timer in response to the second control signal, completing the first time delay, completing the second time delay, and transferring the electrical connection from the first power source to the second power source in response to the first and second time delays, wherein the second time delay is nested within the first time delay.

BRIEF DESCRIPTION OF THE DRAWINGS

Referring now to the figures, which are exemplary embodiments, and wherein the like elements are numbered alike.

DETAILED DESCRIPTION

A detailed description of an embodiment of the present invention is presented herein by way of exemplification and not limitation with reference to FIGS. 1-5.

Figure 1:
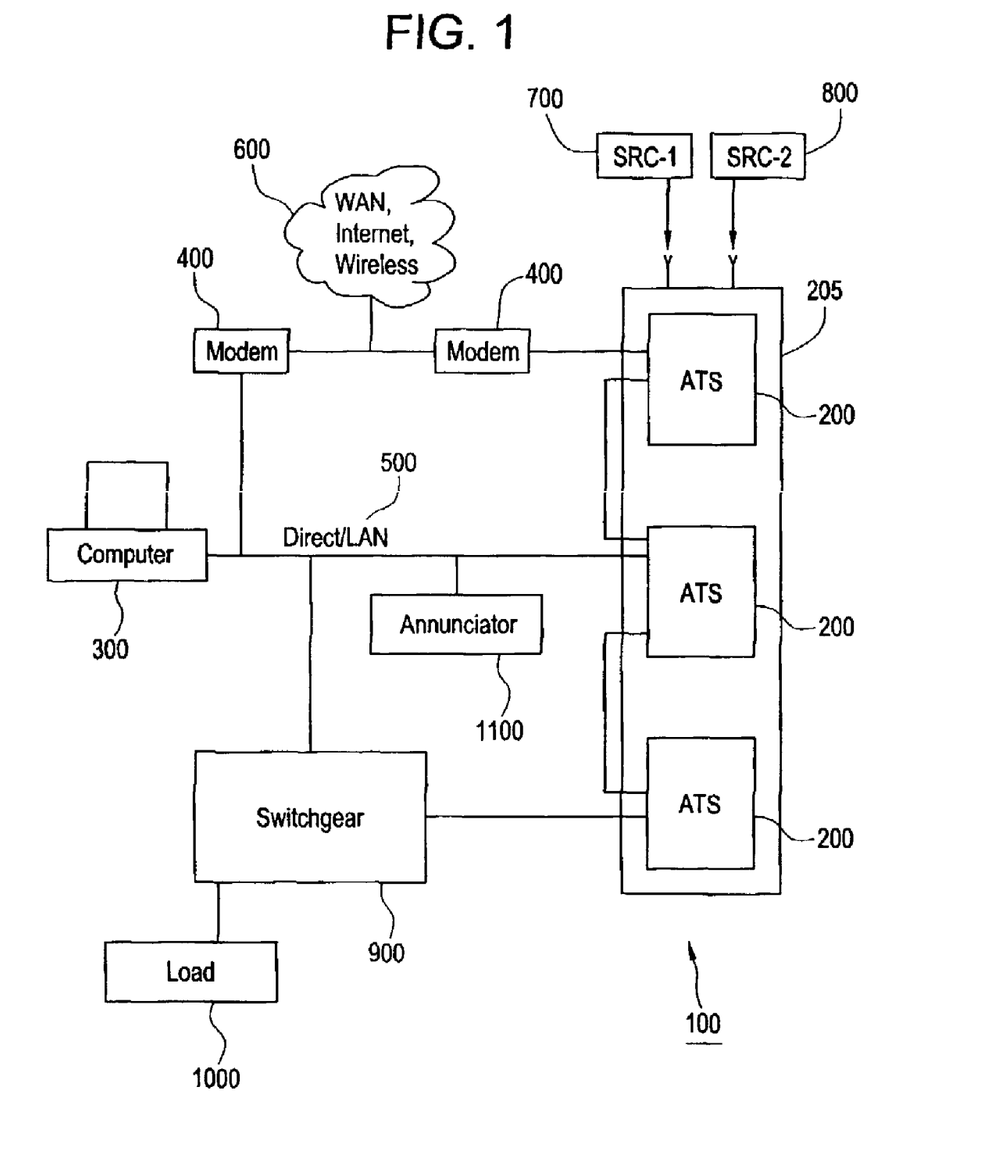
FIG. 1 depicts a generalized schematic diagram showing an ATS control system operative for implementing the present invention.

FIG. 1 depicts a generalized schematic diagram showing an ATS control system (ATSCS) 100 operative for monitoring, controlling and programming an arrangement of ATS's 200 disposed within distribution gear 205. Signal communication and power distribution amongst and between elements of the ATSCS 100 are depicted by single lines, however, it is understood that the single lines may also represent multiple lines, such as for example three phase power distribution from a polyphase power source. The ATSCS 100 may include at least one ATS 200 in signal communication with at least one computer 300 and at least one modem 400. The computer 300 may be any device having the ability to communicate with the ATS 200, such as a personal computer, a telephone with modem interface, a personal digital assistant (PDA), or the like. The computer 300 is arranged in direct communication with ATS 200 via a local area network (LAN), or the like, and may include more than one computer 300. The ATSCS 100 also includes connections via a modem 400 to a wide area network 600, such as the internet or wireless communication system. Modem 400 may also be an Ethernet connection, or some other connection suitable for communication with the LAN 500 or WAN 600. Via the ATSCS 100, an ATS 200 may be controlled or programmed to switch between a primary power source-1 700 and a secondary power source-2 800. Power source-1 700 is typically a utility, that is, power provided by a utility company, and power source-2 800 is typically a backup power source, such as an engine-generator set. However, alternative power sources may be employed. Power from either source-1 700 or source-2 800 is delivered through the ATS 200 to the switchgear 900 and to the load 1000. Examples of typical loads 1000 include motors and elevators. An annunciator 1100 provides an interface for communication with other remote control/monitoring systems.

Figure 2:
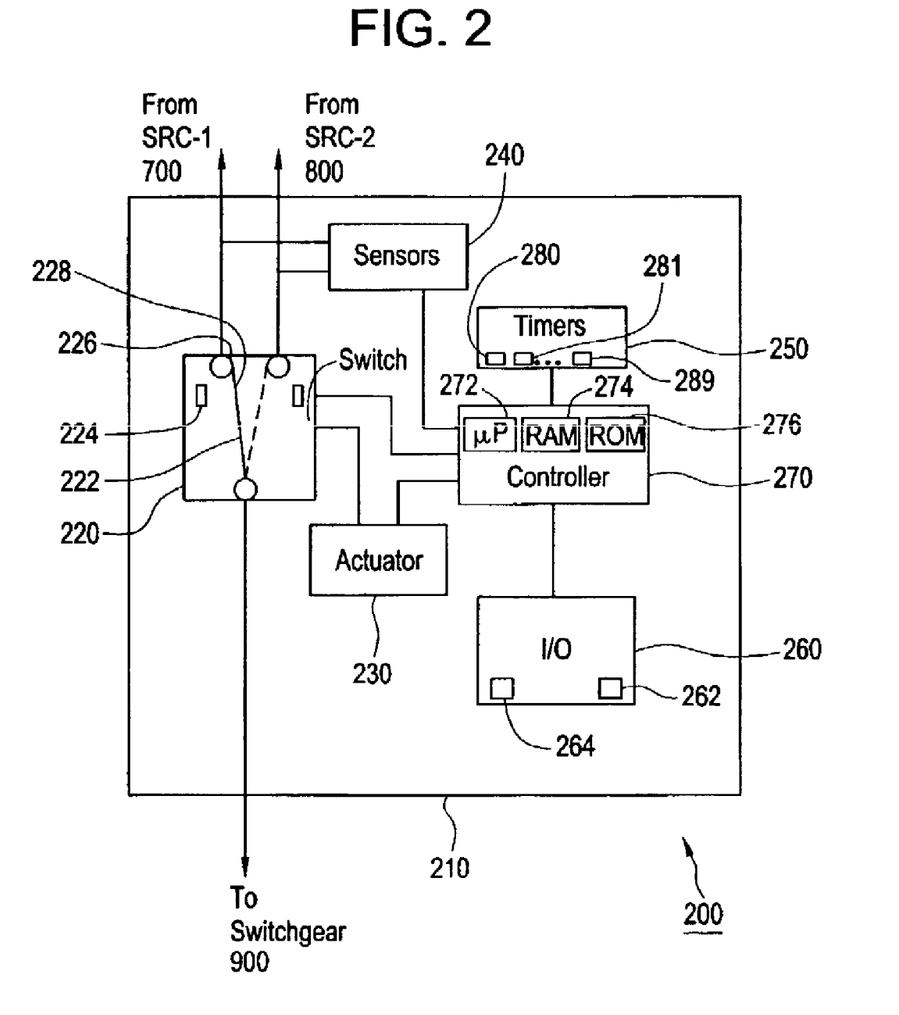
FIG. 2 depicts a generalized schematic diagram showing the operative and communicative relationships amongst the components of the ATS for implementing the present invention.

FIG. 2 depicts a generalized schematic diagram showing the operative and communicative relationships amongst and between the components of the ATS 200 for monitoring, controlling and programming the ATS 200. The ATS 200 includes an enclosure 210, a switch 220, an actuator 230, sensors 240, timers 250, an input/output (I/O) device 260, and a controller 270. Timers 250 are generally referred to as timers 250 and specifically referred to as timers 280-289, as discussed below. The sensors 240, timers 250 and I/O 260 may be incorporated into the controller 270 or may be external. In this manner, the controller 270 may provide a signal to a timer 250 that provides a timing sequence, or the timing function may be incorporated into the controller 270 through internal logic, thereby providing the timing sequence through internal code. Enclosure 210 houses the components of the ATS 200, however, some components of the ATS 200, such as for example the I/O device 260, may be mounted on a front door or front panel (not shown) of enclosure 210 for easier viewing and access by a user. Other components of the ATS 200, such as for example the timers 250 or controller 270, may be mounted on the interior surface of the front door or front panel (not shown) of enclosure 210 for efficiency of use of interior space or ease of access by maintenance personnel.

Switch 220 includes a switching assembly 222, position sensors 224, and electrical contacts 226, 228. Under the action of actuator 230, switching assembly 222 moves from a first position being in connection with a first power source, power source-1 700, to a second position being in connection with a second power source, power source-2 800. The first and second positions of switching assembly 222 are depicted in solid line and dashed line, respectively. Position sensors 224 provide logical information to controller 270 regarding the position of switching assembly 222.

Actuator 230 includes a drive and overcenter mechanism (not shown) to provide a mechanically locked position of switching assembly 222, however, other drive and overcentering mechanism systems suitable for operating switching assembly 222 may be employed. An example of such a drive and overcentering mechanism is used in GE Zenith's ZTS series automatic transfer switches. A high speed drive, such as, for example, the high speed drive used in GE Zenith's ZTS series ATS's, may also be employed, which provides for rapid transfer of switching assembly 222 from the first position to the second position, and vice versa. Some high speed drives are capable of contact transfers insignificantly less than 100 milliseconds. The use of high contact pressure, which may be provided by using high-force contact springs, in switching assembly 222 and positive mechanical locking in actuator 230 provides for high withstand ratings and high contact-closing ratings. The withstand rating of a device is generally indicative of the ability of the device to "withstand" a threshold surge of current in the power system. Actuator 230 receives operational commands from controller 270.

Sensors 240 include but are not limited to; voltage sensors, current sensors, and frequency sensors. Sensors 240 provide power system information to controller 270 Such information would include, but is not limited to, utility or backup voltage level, utility or backup current level, and utility or backup system frequency. Based on known nominal power' system values, controller 270 can then determine the percentage-of-nominal that the respective power source is operating at, and be programmed to act accordingly.

Timers 250 include but are not limited to; engine-start delay timer (P-timer) 280, transfer-to-backup delay timer (W-timer) 281, transfer live-sources presignal timer (W3-timer) 282, retransfer live-sources presignal timer (T3-timer) 283, open-position delay timers (DW timer 284 and DT timer 285), pre & post-transfer delay timer (A6 timer 286 and A62 timer 287), transfer-to-primary delay timer (T-timer) 288, and engine-cool-down delay timer (U-timer) 289. The delay timers typically operate in concert with auxiliary contacts or sensors (not shown) to open and close control circuits (not shown) in a predefined manner, thereby providing control logic to controller 270, which in turn provides operational commands to actuator 230. Timers 250 involved in transferring switch 220 from a source-1 700 connection to a source-2 800 connection include; P-timer 280, W-timer 281, W3-timer 282, DW-timer 284, and A6/A62 timers 286, 287, which will be described in detail below with reference to FIG. 3. Timers 250 involved in transferring switch 220 from a source-2 800 connection to a source-1 700 connection include; T-timer 288, T3-timer 283, DT-timer 285, A6/A62 timers 286, 287, and U-timer 289, which will be described in detail below with reference to FIG. 4.

I/O device 260 includes a control panel 262 for inputting information and for making selections and adjustments to control settings, and a display unit 264 for providing system information to the user. As shown in FIG. 1, the I/O device 260, computer 300, internet 600, or annunciator 110, may all be used to interface with controller 270. However, for ease of discussion, reference will be made only to the I/O device 260, where it is understood that the other communication devices are equally capable of communicating with controller 270. The use of I/O device 260 to input operational criteria to controller 270 will be described below in reference to the flowchart of FIG. 5. The system information that may be displayed on I/O device 260 includes, but is not limited to, the position of switch 220 and the operational power levels of source-1 700 and source-2 800, which would include for example voltage, current and frequency. I/O device 260 is also capable of providing the user with information regarding the timer sequences that have been programmed and saved in controller 270.

Controller 270 includes a microprocessor, or microprocessors, 272 for implementing system code and instructional code, random access memory (RAM) 274 for storing temporary data and instructional code, read only memory (ROM) 276 for storing system code, and appropriate input and output circuits of a known type for receiving the various input signals and for outputting the various control commands. As discussed above, controller 270 interfaces and communicates with switch 220, actuator 230, sensors 240, timers 250, and I/O device 260, to provide operational control of ATS 200. Accordingly, controller 270 is considered to be in operable communication with various components of ATS 200.

Figure 3:
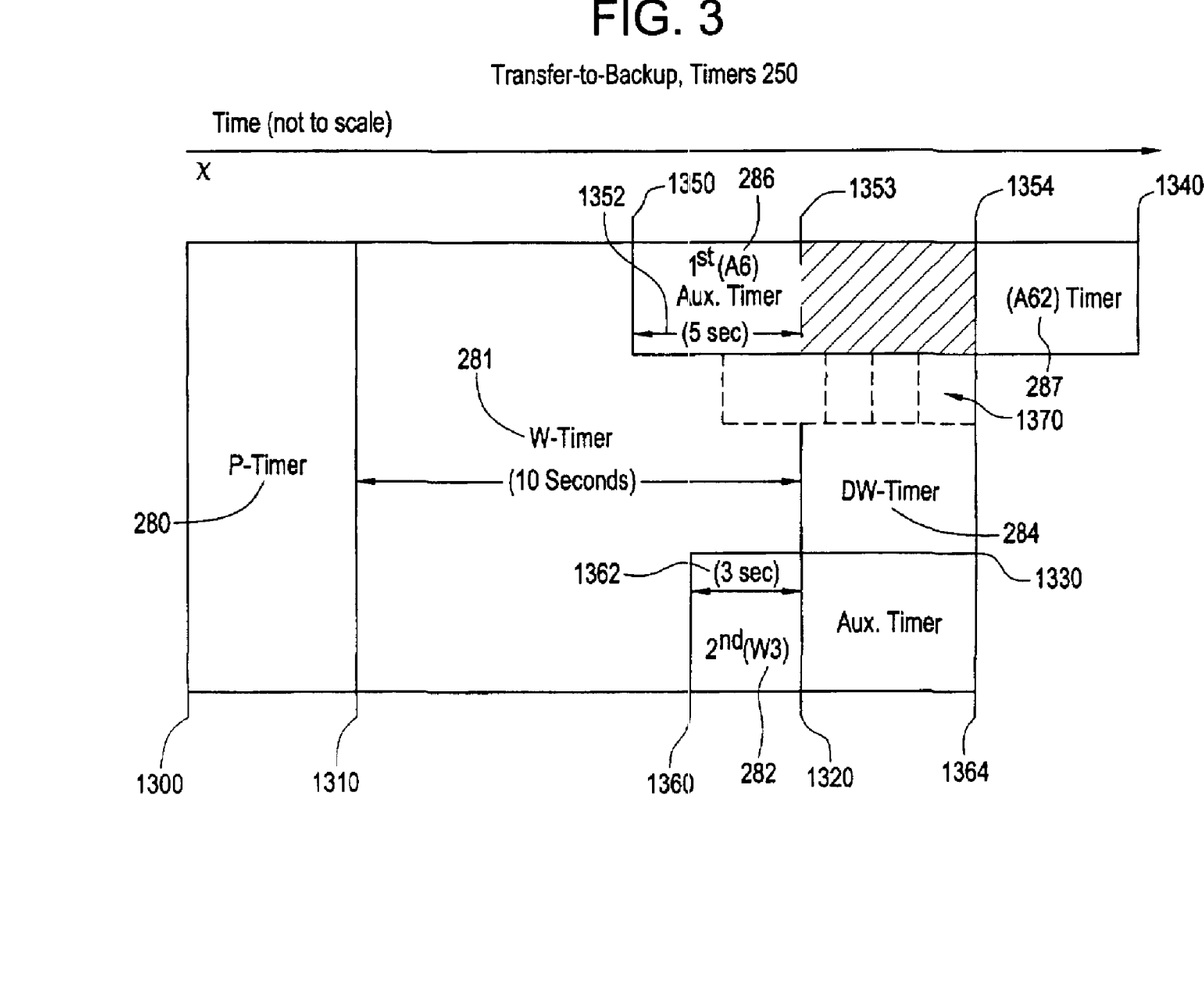
FIG. 3 depicts a timing sequence for transferring connection of the ATS to a secondary power that implements the present invention.
Figure 4:
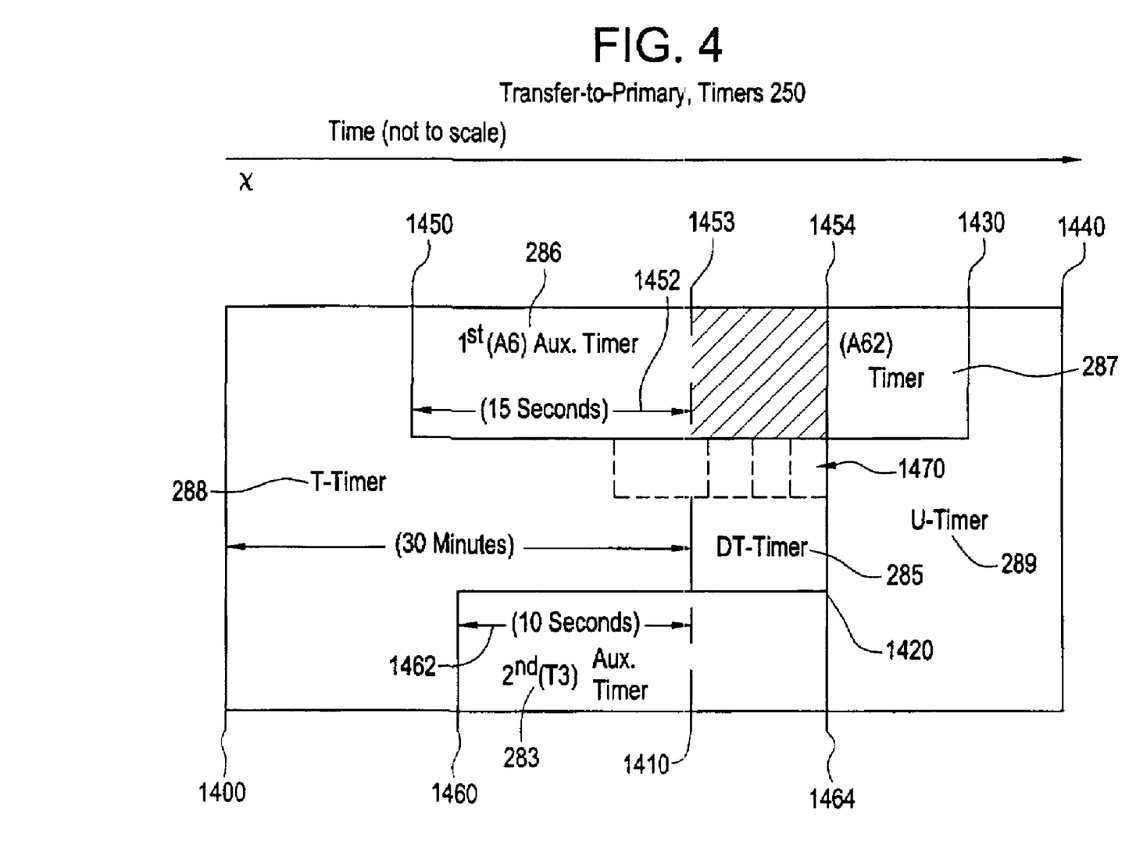
FIG. 4 depicts a timing sequence for transferring connection of the ATS to a primary power that implements the present invention.

FIGS. 3 and 4 are depicted with time (shown not to scale) oriented along the horizontal axis (x-axis). The delay time associated with a particular timer 250 (discussed in detail below) is depicted as the time between the left and right ends of the respective timer blocks. Referring now to FIG. 3, a timing sequence is depicted for transferring connection of ATS 200 from source-1 700 to source-2 800, otherwise referred to as a transfer-to-backup. In accordance with FIG. 3, the transfer-to-backup sequence is initiated 1300 when a parameter of source-1 700 falls below a predetermined value, such as for example when the voltage level falls below 80% of nominal. At this point, source-2 800 (for example, engine-generator set) is started and P-timer 280 is initiated. The parameter that initiates the P-timer 280, such as the voltage level of source-1 700 falling below 80% of nominal, is adjustable.

P-timer 280 provides a delay during engine start up to allow the engine-generator set to get up to speed in preparation for transfer. The delay time of P-timer 280 is typically 3-seconds, but is an adjustable parameter, such as, for example, between 0-10 seconds. At the end of the P-timer delay 1 310, source-2 800 becomes available and W-timer 281 is initiated.

W-timer 281 provides a delay in the transfer sequence in order for controller 270 to verify that source-2 800 is appropriately available. The appropriate availability of source-2 800 is typically established when the source-2 voltage level reaches 90% of nominal, and the frequency reaches 95% of nominal. The delay of W-timer 281 is typically 1-second, but is an adjustable parameter, such as, for example, between 0-5 minutes. At the end of the W-timer delay 1320, ATS 200 opens and DW-timer 284 is initiated.

DW-timer 284 provides a delay in moving switching assembly 222 from an open condition to a closed condition on source-2 800 in order for the load voltage to decay below a predetermined level. The delay of DW-timer 284 is typically dependent on this predetermined voltage level, which is typically 30% of nominal, however, the threshold value for this predetermined voltage level is an adjustable parameter. If the load voltage has been at 0-30% of its nominal value for a predetermined length of time, then DW-timer 284 can be bypassed, thereby shortening the transfer sequence. Whether DW-timer 284 is bypassed or the DW-timer delay is set to zero, the effect is the same, and the result is a shortened transfer sequence. At the end of the DW-timer delay 1330, ATS 200 closes onto source-2 800 and A62-timer (an auxiliary timer) 287 is initiated. A62 timer 287, if enabled, provides a delay in triggering the startup of a single motor or sequential set of motors. At the end of A62 timer delay 1340, motor startup is signaled.

Nested within the delay time of W-timer 281 is the initiation 1350, 1360 of a first auxiliary timer A6 286 and a second auxiliary timer W3 282 (also referred to as a motor presignal timer, and an elevator presignal timer, respectively). The initiation 1350, 1360 of first and second auxiliary timers 286, 282 occur at predefined times (parameters) 1352, 1362 before the end of the W-timer delay. As shown in FIG. 3, these predefined times are 5-seconds, 1352, and 3-seconds, 1362, respectively, but may be programmed to other values. As shown in FIG. 3, the numerals 1350, 1353 denote the beginning and end points of the A6 timer delay, and the numerals 1360, 1364 denote the beginning and end points of the W3 timer delay. The predefined time of 5-seconds, regarding A6-timer 286 in FIG. 3, is computed so that the end of A6-timer delay 1353 occurs at any time between the beginning of DW-timer delay 1320 and the end of DW-timer delay 1330 (shown as a shaded region between 1353 and 1354). The predefined time of 3-seconds, regarding W3-timer 282 in FIG. 3, is computed so that the end of W3-timer delay 1364 causes the start 1320 of DW-timer delay 284 and the end 1330.

The resulting nested timer delays provide an overall shorter transfer time than a serial arrangement of delays would provide. Once controller 270 is programmed with information regarding the W-timer delay and the presence of first and/or second auxiliary timers 286, 282, controller 270 can compute the appropriate initiation times for first and second auxiliary timers that results in first and second auxiliary timer delays ending at the appropriate times as discussed above. First and second auxiliary timers 286 and 282 provide appropriate delays in the closing, and/or opening of control contacts that power up the loads (for example, a motor and elevator), such that the loads are energized or de-energized in a controlled manner before being powered up on source-2 800 when switching assembly 222 is switched over to source-2 800. The delay of auxiliary timers is typically 20-seconds, but is an adjustable parameter. Regarding the nesting of multiple time delays, if the time delays associated with the W-timer 281, first auxiliary timer 286, and second auxiliary timer 282 are referred to as first, second, and third time delays, respectively, then, as seen by referring to FIG. 3, the second and third time delays are nested within the first time delay. Additional timers may be employed as desired, as depicted by dotted lines 1370 in FIG. 3.

Referring now to FIG. 4. FIG. 4 depicts a timing sequence for retransferring connection of ATS 200 from source-2 800 to source-1 700, otherwise referred to as a retransfer-to-primary. In accordance with FIG. 4, the retransfer-to-primary sequence is initiated 1400 when a parameter of source-1 700 rises above a predetermined value, such as for example when the voltage level rises above 90% of nominal. At this point, source-1 700 (for example, a utility) is determined to be available and T-timer 288 is initiated.

T-timer 288 provides a delay in the retransfer sequence in order for controller 270 to verify that source-1 700 is appropriately available. The appropriate availability of source-1 700 is typically established when the source-1 voltage level reaches 90% of nominal. The delay of T-timer 288 is typically 30-minutes, but is an adjustable parameter, such as, for example, between 0-60 minutes. At the end of the T-timer delay 1410, ATS 200 opens and DT-timer 285 is initiated. If source-2 800 suddenly becomes unavailable, the delay of T-timer 250 can be effectively set to zero for immediate transfer.

DT-timer 285 provides a delay in moving switching assembly 222 from an open condition to a closed condition on source-1 700 in order for the load voltage to decay below a predetermined level. The delay of DT-timer 285 is typically dependent on this predetermined voltage level, which is typically 30% of nominal, however, the threshold value for this predetermined voltage level is an adjustable parameter. If the load voltage has been at 0-30% of its nominal value for a predetermined length of time, then DT-timer 285 can be bypassed, thereby shortening the transfer sequence. Whether DT-timer 285 is bypassed or the DT-timer delay is set to zero, the effect is the same, and the result is a shortened transfer sequence. At the end of the DT-timer delay 1420, ATS 200 closes onto source-1 700 and both the A62-timer 287 and the U-timer 289 are initiated. A62 timer 287, if enabled, provides a delay as discussed above.

U-timer 289 provides a delay to allow the engine of the engine-generator set to run unloaded after switching assembly 222 has retransferred to source-1 1700, thereby allowing the engine to cool down. The delay of U-timer 289 is typically 5-minutes, but is an adjustable parameter, such as, for example, between 0-60 minutes. At the end of the U-timer delay 1440, controller 270 resets the engine start settings.

Nested within the delay time of T-timer 288 is the initiation 1450, 1460 of a first auxiliary timer A6 286 and a second auxiliary timer T3 283 (also referred to as, a motor presignal timer, and an elevator presignal timer, respectively). The initiation 1450, 1460 of first and/or second auxiliary timers 286, 283 occur at predefined times (parameters) 1452, 1462 before the end of the T-timer delay. As shown in FIG. 4, these predefined times are 15-seconds, 1452, and 10-seconds, 1462, respectively, but may be programmed to other values. As shown in FIG. 4, the numerals 1450, 1453 denote the beginning and end points of the A6 timer delay, and the numerals 1460, 1464 denote the beginning and end points of the T3 timer delay. The predefined time of 15-seconds, regarding A6-timer 286 in FIG. 4, is computed so that the end of A6-timer delay 1453 occurs at any time between the beginning of DT-timer delay 1410 and the end of DT-timer delay 1420 (shown as a shaded region between 1453 and 1454). The predefined time of 10-seconds, regarding T3-timer 283 in FIG. 4, is computed so that the end of T3-timer delay 1464 causes the start 1410 of the DT-timer delay 285 and the end 1420. The resulting nested timer delays provide an overall shorter transfer time than a serial arrangement of delays would provide. Once controller 270 is programmed with information regarding the T-timer delay and the presence of first and/or second auxiliary timers 286, 283, controller 270 can compute the appropriate initiation times for first and second auxiliary timers 286, 283 that results in first and second auxiliary timer delays ending at the appropriate times as discussed above. First and second auxiliary timers 286 and 283 provide appropriate delays in the closing, and/or opening of control contacts that power up the loads (for example, a motor and elevator), such that the loads are energized or de-energized in a controlled manner before being powered up on source-1 700 when switching assembly 222 is switched over to source-1 700. The delay of auxiliary timers is typically 20-seconds, but is an adjustable parameter.

All timer 250 settings that are adjustable may be programmed into controller 270 via I/O device 260, thereby providing a variety of control settings in an intelligent ATS.

Figure 5:
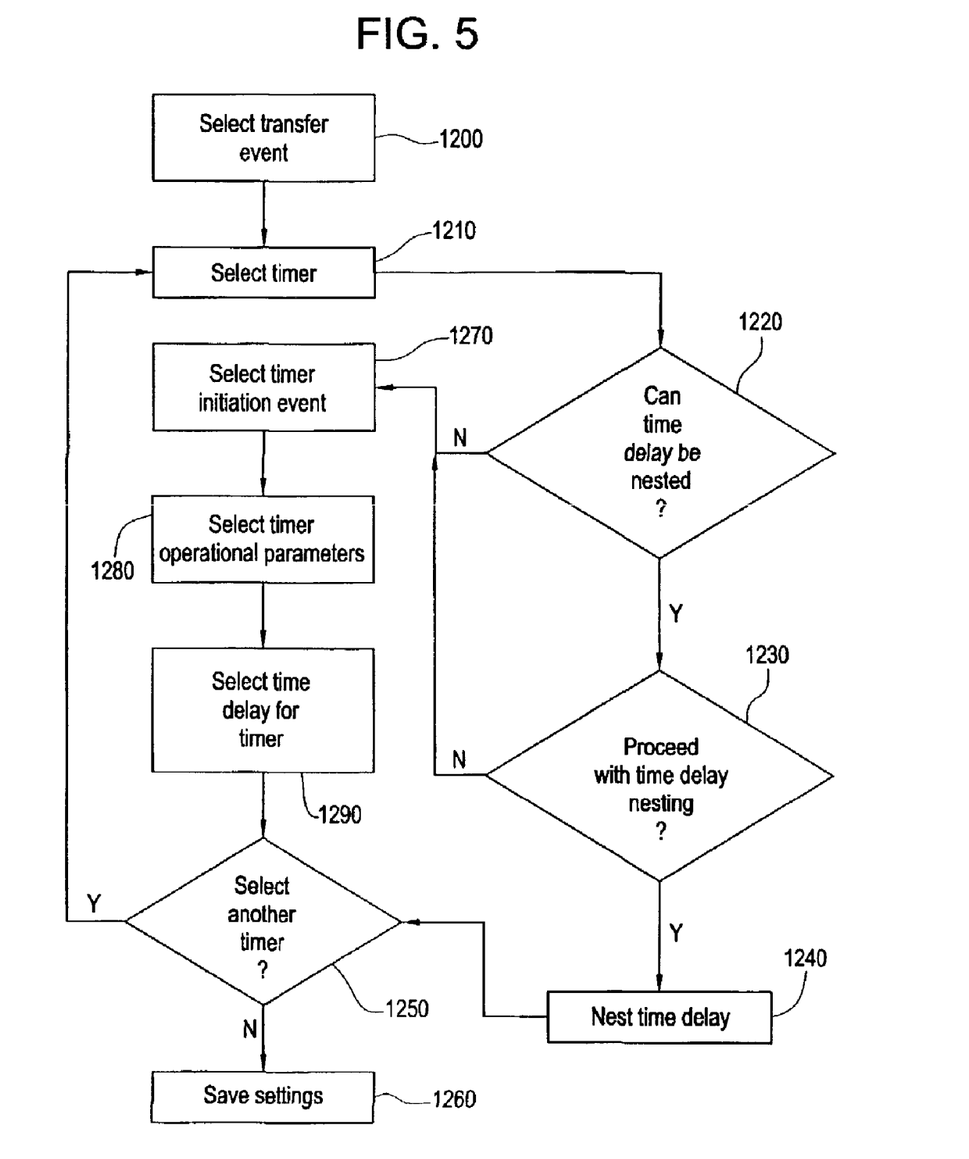
FIG. 5 depicts a method that implements the present invention.

Referring to the flowchart of FIG. 5, controller 270 can be programmed to adjust the various timers 250 by interfacing with I/O device 260 through a suitable interface device, such as for example a touch screen. The user selects 1200 a transfer event to be controlled, such as transfer-to-backup or retransfer-to-primary, and then selects 1210 a timer that will be involved in the transfer event, such as one of the timers 250 listed and discussed above. After selecting a timer, the user is then informed 1220 by controller 270 via I/O device 260 as to whether the selected timer 250 can be nested. If the selected timer 250 can be nested, the user is then prompted 1230 by controller 270 via I/O device 260 as to whether the selected timer 250 should be nested. If the selected timer 250 should be nested, controller 270 computes 1240 the appropriate nesting arrangement for the selected time delay, by subtracting the appropriate predefined time 1352, 1362, 1452, 1462 from the endpoint of the respective time delay of the W-timer 281 or the T-timer 288, and then queries 1250 the user as to whether another timer 250 is to be selected. If another timer 250 is to be selected, the logic flows back to block 1210. If another timer 250 is not to be selected, then controller 270 saves 1260 the requested settings and completes the programming sequence. The flowchart of FIG. 5 is presented to outline one sample method of software or other logic flow and is not meant to indicate the only method that may be employed.

If at block 1220 the selected timer 250 cannot be nested, the user is then prompted to select 1270 the timer initiation event, such as for example, at the end of the W-timer delay for the DW-timer, to select 1280 the timer operational parameters, if any, such as for example, a 20% threshold voltage level for the DW-timer, and to select 1290 the length of the timer delay for the selected timer 250. After block 1290, the logic flows to block 1250, and proceeds as discussed above.

If at block 1230 the selected timer 250 should not be nested, thereby providing the user with the option to override the time delay nesting arrangement, the logic flows to block 1270, and proceeds as discussed above.

The disclosed embodiment has the advantage of nested time delays, which results in a shortened transfer sequence than would be available with serially arranged time delays. While the nesting of the time delays has herein been described as being an arrangement where the initiation of a time delay (such as with respect to a W3-timer, for example) occurs before another time delay has ended (such as with respect to a W-timer, for example), and where the W3-timer delay ends after the W-timer delay has ended, it will be appreciated that a W3-timer delay may also end at the same time that a W-timer delay ends, such as when the DW-timer delay is set to zero. Thus, nested timer delays may be partially nested, as in the former example above, or wholly nested, as in the latter example above.

The disclosed embodiment also has the advantage of being programmable, which permits the user to access information from controller 270 regarding the reason for a timer operation and the reason for the occurrence of a transfer event. By appropriate programming, controller 270 can permit the bypass of a timer delay, or can shorten or lengthen a timer delay, thereby introducing a degree of intelligence into the ATS, and a means for optimizing system performance. Further intelligence can be added to the system through appropriate programming whereby controller 270 determines the length of time of a power failure, computes whether additional time delay at the DT/DW-timers are needed, and then implements a longer time delay. Yet additional intelligence can be added through programming whereby controller 270 monitors the availability of backup power and shortens appropriate timer delays to more quickly restore power under an emergency utility outage condition.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of switching an automatic transfer switch between first and second power sources comprising:
    receiving a first control signal at a first timer in response to a below-threshold signal at a primary source;
    initiating a first time delay at a first tinier in response to said first control signal;
    receiving a second control signal at a second timer from said controller;
    initiating a second time delay at a second timer in response to said second control signal;
    completing said first time delay;
    completing said second lime delay; and
    transferring the electrical connection from the first power source to the second power source in response to said first and second time delays; wherein
    said second time delay is nested within said first time delay.

2. The method of claim 1, wherein:
    said initiating a second time delay at a second timer, comprises;
    initiating the beginning time of said second time delay in response to the end time of said first time delay.

3. The method of claim 1, wherein:
    said receiving a first control signal at a first timer comprises receiving a first logic timing function at a controller; and wherein
    said receiving a second control signal at a second timer comprises receiving a second logic timing function at a controller.

4. An automatic transfer switch, comprising:
    means for receiving a first control signal at a first timer in response to a below-threshold signal at a primary source;
    means for initiating a first time delay at a first timer in response to said first control signal;
    means for receiving a second control signal at a second timer from said controller;
    means for initiating a second time delay at a second timer in response to said second control signal;
    means for completing said first time delay;
    means rot completing said second time delay; and
    means for transferring the electrical connection from the first power source to die second power source in response to said first and second time delays; wherein
    said second time delay is nested within said first time delay.

5. The automatic transfer switch of claim 4, wherein said means for initiating a second time delay at a second timer, comprises:
    means for initiating the beginning time of said second time delay in response to the end time of said first time delay.

6. The automatic transfer switch of claim 4, wherein:
    said means for receiving a first control signal at a first timer comprises means for receiving a first logic timing function at a controller; and
    said means for receiving a second control signal at a second timer comprises means for receiving a second logic timing function at a controller.

* * * * *